United States Patent [19]

Lai

[11] Patent Number: 6,015,110

[45] Date of Patent: Jan. 18, 2000

[54] WIRE RECEIVING DEVICE

[76] Inventor: Cheng-Ting Lai, No. 17, Alley 28, Lane 303, Mei Tsuen Taicheng, Taiwan

[21] Appl. No.: 09/231,647

[22] Filed: Jan. 15, 1999

[30] Foreign Application Priority Data

Jul. 10, 1998 [TW] Taiwan ........................... 85219503A02

[51] Int. Cl.⁷ .................................................. B65H 75/40
[52] U.S. Cl. ................................... 242/388.1; 242/396.4; 242/396.9
[58] Field of Search ................................. 242/388.1, 388, 242/388.5, 378.1, 378.2, 378.3, 396.2, 396.4, 396.9

[56] References Cited

U.S. PATENT DOCUMENTS 3,208,121  9/1965  Price ..................................... 242/388.1
3,224,706  12/1965  Bastow ................................. 242/378.1
5,853,136  12/1998  Lai ....................................... 242/388.1

*Primary Examiner*—John M. Jillions
*Attorney, Agent, or Firm*—Bacon & Thomas, PLLC

[57] ABSTRACT

A wire receiving device includes a base member having a wire entrance and an aperture, a C-shaped member, a wire receiving member rotatably received in the C-shaped member and the base member, a cap co-rotatably connected to the wire receiving member and engaged with the base member, and a control member movably extending radially into the base member. The control member has a pawl engaged with the annular teeth defined in the bottom of the wire receiving member. A wire is hooked by the wire receiving member and wrapped around the shaft of the wire receiving member by rotating the cap. The engagement of the pawl and the annular teeth is released by pushing the control member so that the cap and the wire receiving member can be rotated reversely.

8 Claims, 6 Drawing Sheets

WIRE RECEIVING DEVICE

FIELD OF THE INVENTION

The present invention relates to a wire receiving device which receives or releases wires of electrical apparatus by rotating the device, the device comprising a control member which controls the device to be operated or not.

BACKGROUND OF THE INVENTION

Electrical apparatuses are used in out daily life frequently and each have at least one wire connected to the electrical power source so that there will be a plurality of wires extending from the electrical apparatuses. In order to have an orderly arrangement for these apparatuses, the users generally bind the wires together by a strip. Taking the computer as the example, the computer generally is connected to a printer, a modem machine and a monitor so that at least 10 wires are exposed behind the computer desk and this looks unruly. When one of the apparatuses needs to be repaired, the wires extending therefrom have to be disengaged from the corresponding apparatus, and the repairer has to loosen the strip and then picks the right wires. This process always takes time and has low efficiency.

The present invention intends to provide a wire receiving device which simply wraps the wire into a box-like body and the device has a rotatable cap to retract or release the wire. The device in accordance with the present invention is convenient for the user and all the wires are received in the small device so that the office desk or computer desk will always be kept clean. The present invention overcomes the disadvantages mentioned above.

SUMMARY OF THE INVENTION

In accordance with one aspect of the present invention, there is provided a wire receiving device comprising a base member having a first peripheral wall extending therefrom and a groove defined in the inner side of the first peripheral wall by an upper flange and a lower flange. A wire entrance and an aperture are respectively defined through the first peripheral wall. A central tube having a passage extending therethrough extends from the bottom of the base member. An engaging flange extends radially outward from the top of the central tube.

A C-shaped member has an upper annular recess and a lower annular recess defined in the outside thereof so that the upper flange of the base member is movably received in the lower annular recess. A wire receiving member has a hollow shaft with a lip extending from the lower end thereof so as to be engaged with the engaging flange. An upper plate, a mediated plate and a lower plate respectively extend radially outward from the hollow shaft, wherein the lower plate has an annular teeth defined in the bottom thereof and the mediated plate has a notch defined therein so as to hook the wire to be received in the device. The wire receiving member is rotatably received in the C-shaped member and the base member.

A cap has a second peripheral wall extending from the periphery thereof and a rod extends centrally from the bottom of the cap. The rod is securely inserted into the hollow shaft. The second peripheral wall has a flange extending from the lower edge of the second peripheral wall so as to be received in the upper annular recess of the C-shaped member. A bolt is threadedly engaged into the rod and a spring is biasedly mounted between the rod and the head of the bolt.

A control member is movably received in the aperture and has a pawl member connected to the top thereof. The pawl member is engaged with the annular teeth when the control member is not pushed.

The object of the present invention is to provide a wire receiving device which receives wires into a small box and the wire can be released or retracted by rotating the cap member of the device.

Further objects, advantages, and features of the present invention will become apparent from the following detailed description with appropriate reference to the accompanying drawings.

DETAILED DESCRIPTION OF THE PREFERRED EMBODIMENTS

Figure 1:
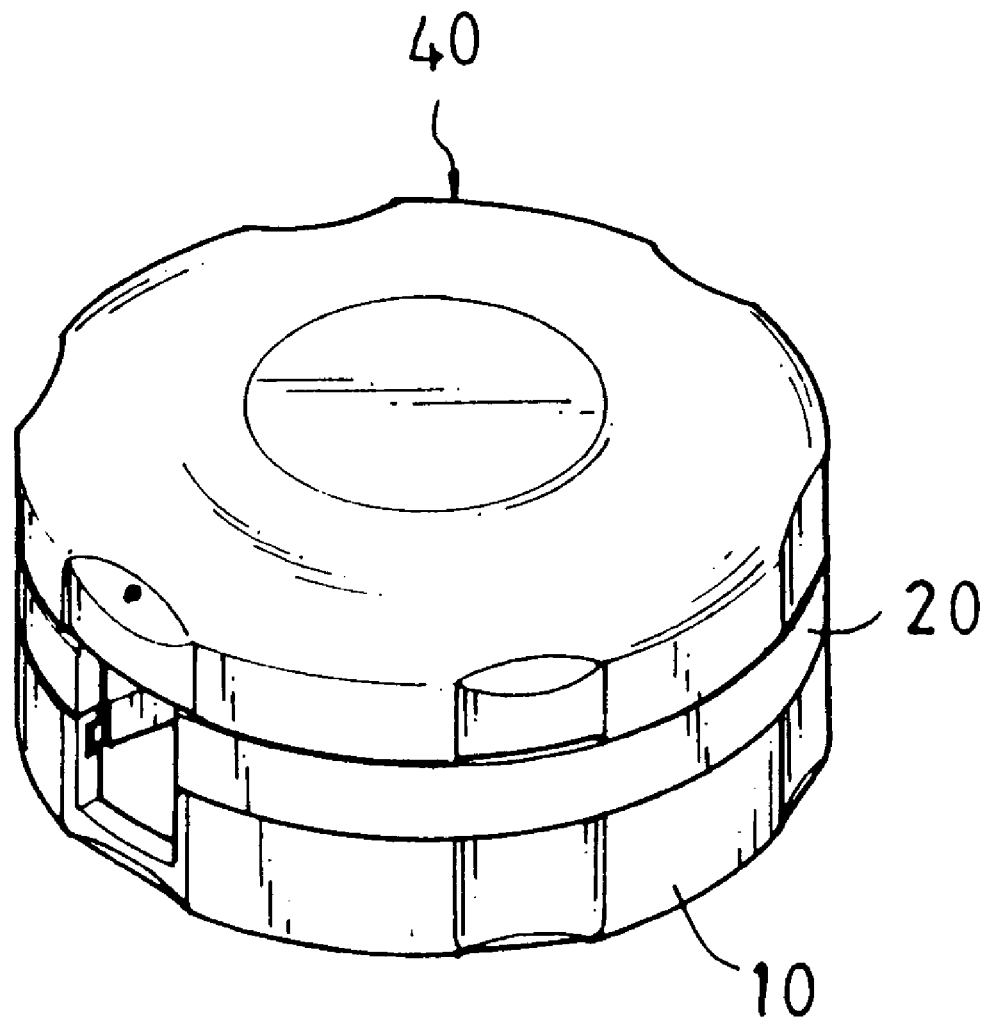
FIG. 1 is a perspective view of the wire receiving device in accordance with the present invention.
Figure 2:
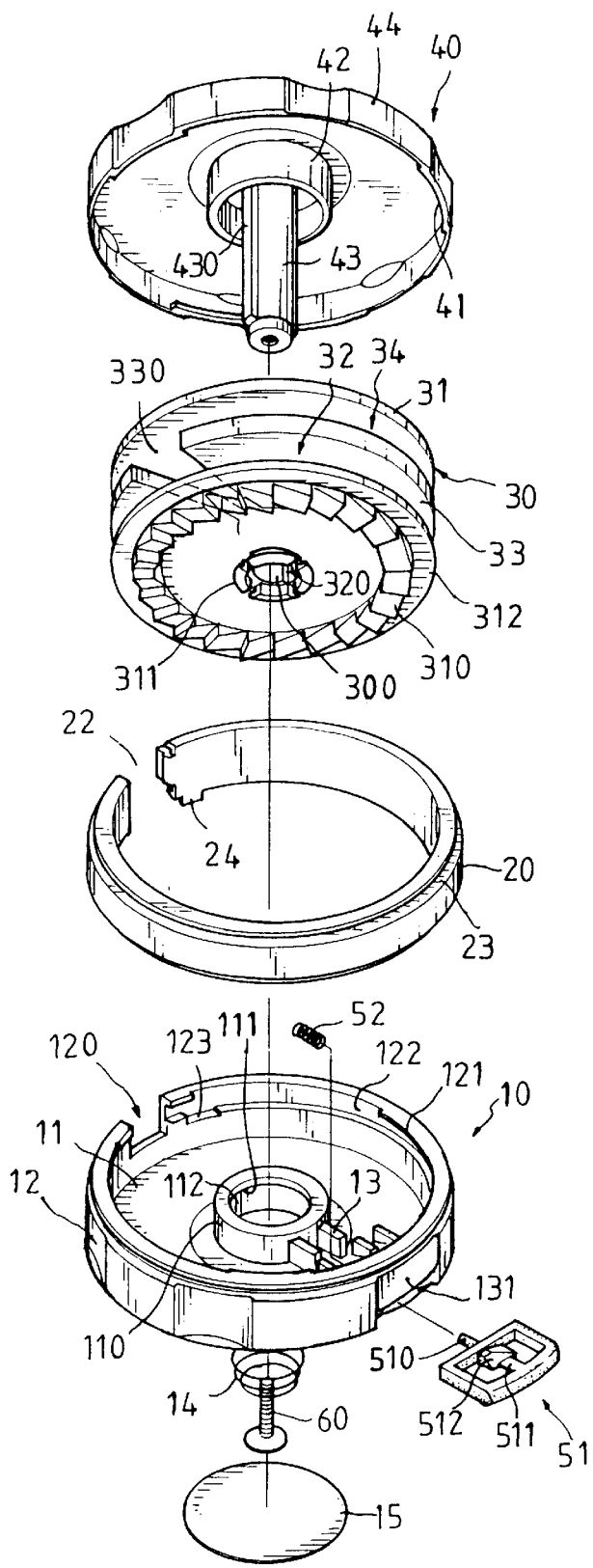
FIG. 2 is an exploded view of the wire receiving device in accordance with the present invention.
Figure 3:
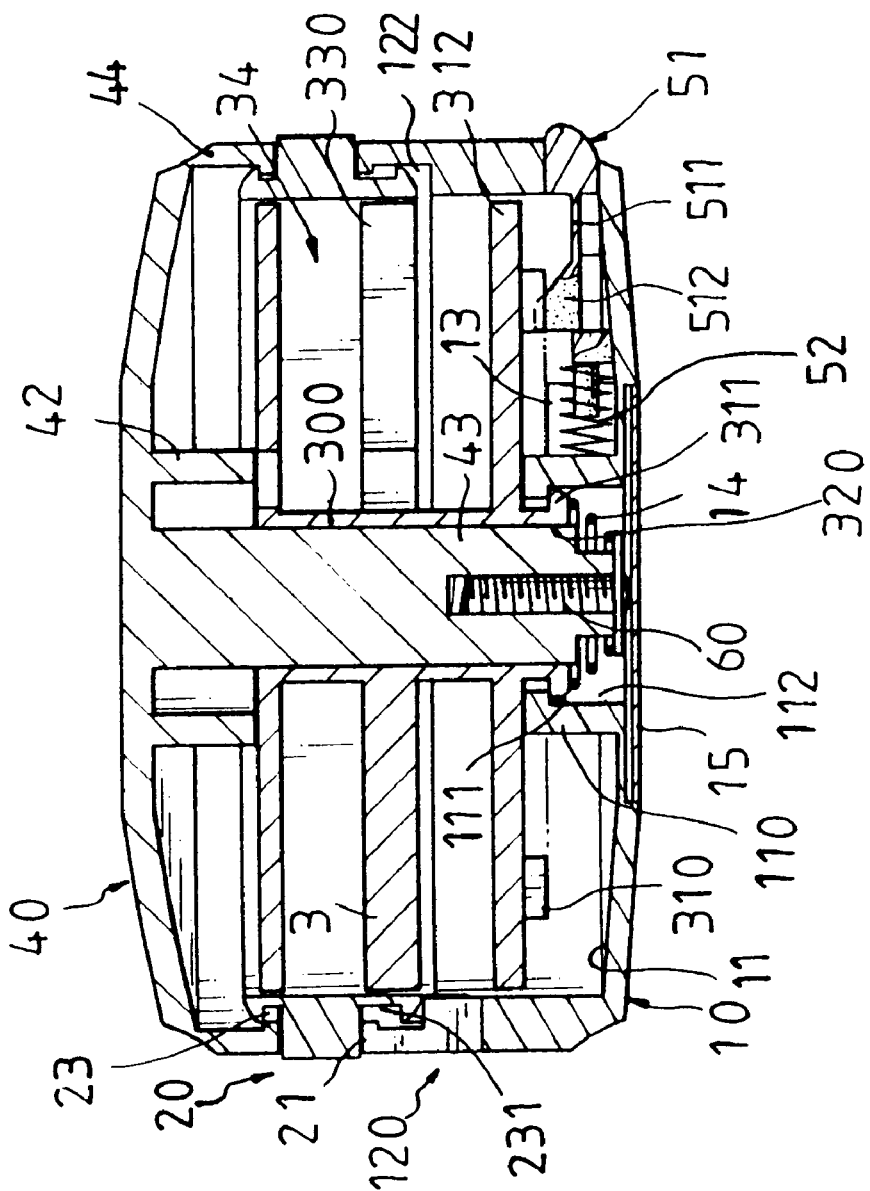
FIG. 3 is a side elevational view, partly in section, of the wire receiving device in accordance with the present invention.

Referring to FIGS. 1 to 4, the wire receiving device in accordance with the present invention comprises a base member (10) having a first peripheral wall (12) extending therefrom and a groove (122) defined in the inner side of the first peripheral wall (12) by an upper flange (121) and a lower flange which has a concavity (123) defined in the upper surface thereof. A wire entrance (120) and an aperture (131) are respectively defined through the first peripheral wall (12) and located in opposite to each other. A central tube (110) extends from the bottom (11) of the base member (10) with a passage (112) defined therethrough. An engaging flange (111) extends radially outward from the top of the central tube (110) and two guide members (13) extend radially outward from the central tube (110).

A C-shaped member (20) has an upper annular recess (23) and a lower annular recess (231) defined in the outside thereof so that the upper flange (121) of the base member (10) is movably received in the lower annular recess (231). That is to say, the lower annular recess (231) is sized that the upper flange (121) can be moved within the lower annular recess (231). The C-shaped member (20) has a protrusion (24) extending from the lower edge thereof such that when the protrusion (24) is received in the concavity (123), the C-shaped member (20) is limited to be rotated.

Figure 4:
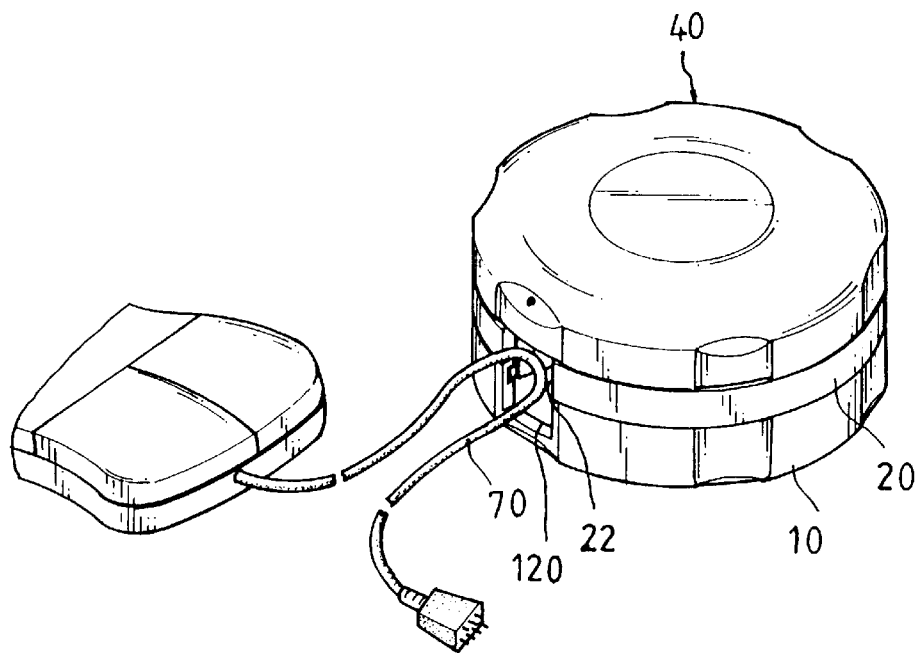
FIG. 4 is a perspective view showing a wire of a mouse inserted into the wire entrance of the device of the present invention.

A wire receiving member (30) has a hollow shaft (300) which has a lip (311) extending from the lower end thereof so as to be engaged with the engaging flange (111) of the central tube (110) such that the wire receiving member (30) is connected to the base member (10) and rotatable relative to the base member (10). An upper plate (31), a mediated plate (33) and a lower plate (312) respectively extend radially outward from the hollow shaft (300) so as to defined two spaces (32), 34 for receiving the wire (70) between the upper plate (31) and the mediated plate (33), and between the mediated plate (33) and the lower plate (312). The lower plate (312) has an annular teeth (310) defined in the bottom thereof and the mediated plate (33) has a notch (330) defined therein so that when the wire (70) is curved and hooked by the notch (330) as shown in FIG. 4. Therefore, the wire receiving member (30) is rotatably received in the C-shaped member (20) and the base member (10).

A cap (40) has a second peripheral wall (44) extending from the periphery thereof and a rod (43) extends centrally from the bottom of the cap (40). The rod (43) has two ribs (430) extending radially outward therefrom so as to be received in the two slots (320) defined in the inside of the hollow shaft (300). A separating tube (42) extends from the bottom of the cap (40) and encloses the rod (43) so that when the rod (43) extends through the hollow shaft (300), the separating tube (42) contacts the upper plate (31) of the wire receiving member (30). Therefore, when rotating the cap (40), the wire receiving member (30) is co-rotated. The second peripheral wall (44) has a flange (41) extending from the lower edge of the second peripheral wall (44) so as to be received in the upper annular recess (23) of the C-shaped member (20).

Figure 6:
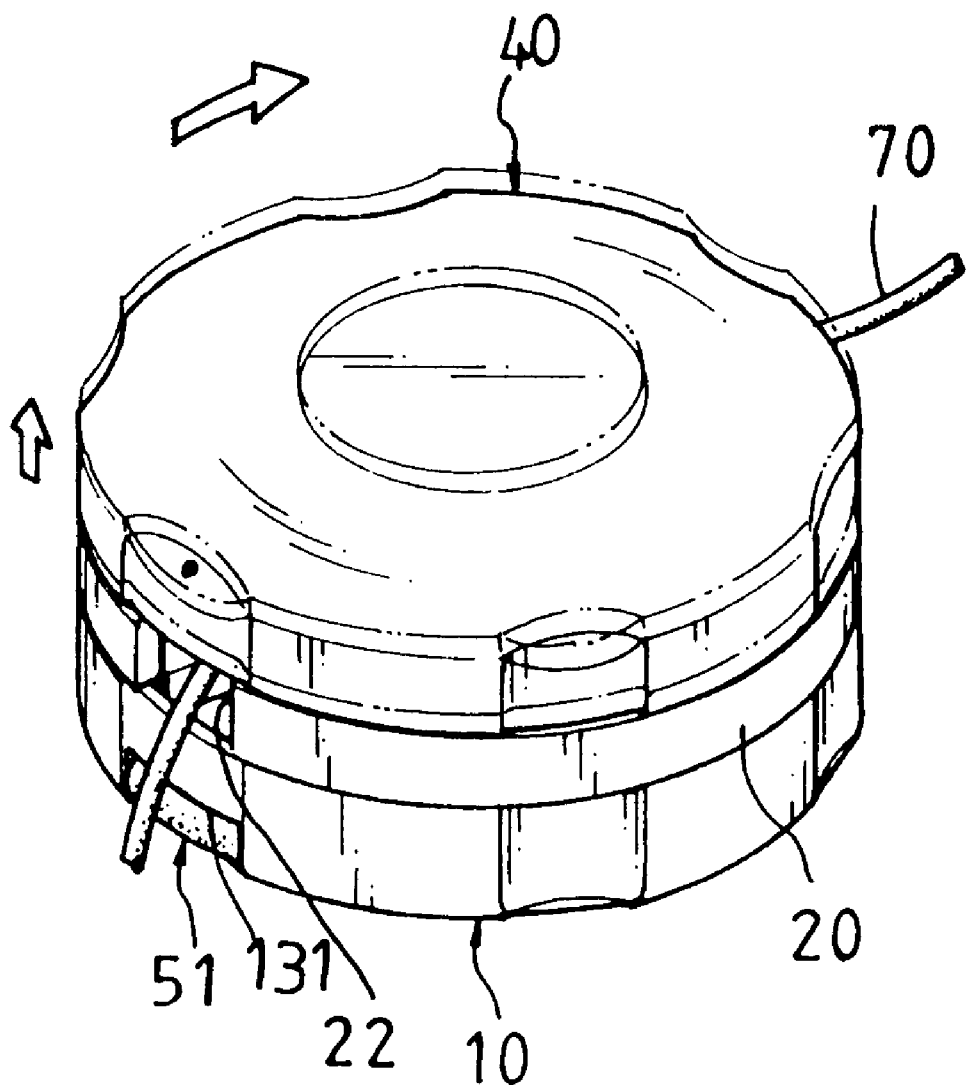
FIG. 6 is a perspective view showing the cap pulled upwardly and rotated.

A bolt (60) is threadedly engaged into the rod (43) extending through the hollow shaft (300) and a spring (16) is biasedly mounted between the rod (43) and the head of the bolt (60) so that the cap (40) together with the C-shaped member (20) can be pulled upwardly away from the base member (10) by compressing the spring (14) as shown in FIG. 6.

A control member (51) having a rectangular body is movably received in the aperture (131) and has a pawl member (512) connected to the top thereof, wherein the pawl member (512) is connected to a flexible rib (511) of the rectangular body of the control member (51) and the pawl member (512) is engaged with the annular teeth (310) when the control member (51) is not pushed. The control member (51) has a pin (510) extending therefrom which has a spring (52) mounted thereto which is biased between the central tube (110) and the control member (51). The pin (51) and the spring (62) are located between the two guide members (13). A decorative board (15) can be snapped on the bottom of the base member (10) and cover the bolt (60).

Figure 5:
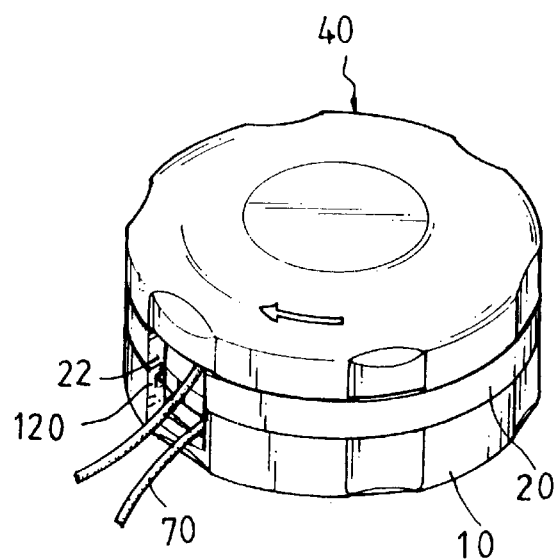
FIG. 5 is a perspective view showing the wire of the mouse received in the device of the present invention.

Referring to FIGS. 4 to 6, the wire (70) is hooked by the notch (330) and then pulling the cap (40) and the C-shaped member (20) upwardly and rotating the cap (40) and C-shaped member (20) to wrap the wire (70) around the hollow shaft (300) and receive the wire (70) in the two spaces (32, 34). The other end of the wire (70) is then carried with the wire receiving member (30) and the C-shaped member (20) and extends from the gap of the C-shaped member (20). When releasing the wire (70), the control member (51) is pushed to move the pawl (512) away from the annular teeth (310) so that the wire (70) can pulled from the device freely.

Figure 7:
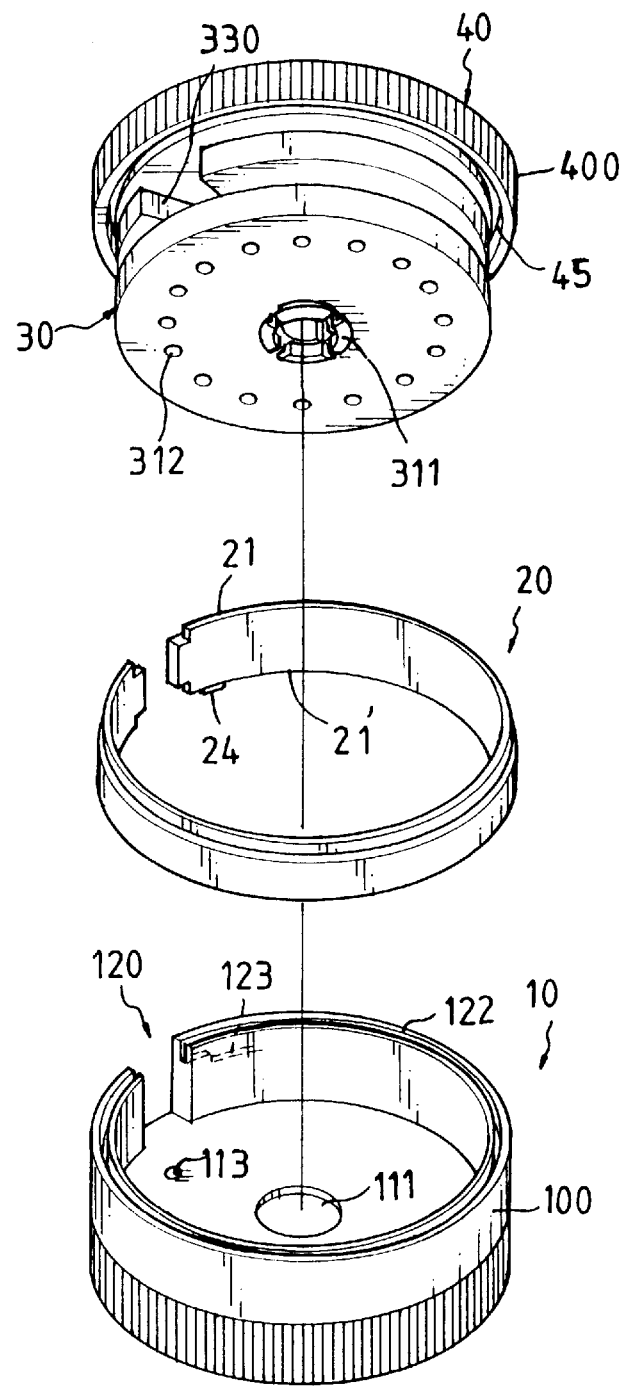
FIG. 7 is an exploded view showing another embodiment of the wire receiving device in accordance with the present invention.

FIG. 7 shows another embodiment of the present invention, wherein the cap (40) is integrally connected to the wire receiving member (30) and has an annular recess (45) defined between the wire receiving member (30) and the peripheral wall (400) so as to let the upper track (21) of the C-shaped member (20) rotatably received therein. The C-shaped member (20) further has a lower track (21') with a protrusion (24) extending therefrom. The wire receiving member (30) has a plurality of dents (312) defined in the bottom thereof and a lip (311) extending from the bottom thereof. The base member (10) has a bottom with a hole (111) defined therethrough so that the lip (311) is rotatably engaged with the periphery defining the hole (111). The base member (10) further has an annular groove (122) defined in the upper surface of the peripheral wall (100) extending from the bottom thereof so as to receive the lower track (21') of the ring member (20). A boss (113) extends upwardly from the bottom of the base member (10) so as to be received in one of the dents (312) when the wire receiving member (30) is rotated. The peripheral wall (100) has a wire entrance (120) defined therein so as to let the wire to be hooked by the notch (330) of the wire receiving member (30). The bottom defining the annular groove (122) of the base member (10) has a concavity (123) defined therein and located near the wire entrance (120) so as to receive the protrusion (24) to limit the rotation of the C-shaped member (20).

The invention is not limited to the above embodiment but various modifications thereof may be made. It will be understood by those skilled in the art that various changes in form and detail may made without departing from the scope and spirit of the present invention.

What is claimed is:

1. A wire receiving device comprising:

a base member (10) having a first peripheral wall (12) extending therefrom and a groove (122) defined in the inner side of said first peripheral wall (12) by an upper flange (121) and a lower flange, a wire entrance (120) and an aperture (131) respectively defined through said first peripheral wall (12), a central tube (110) extending from the bottom of said base member (10) and a passage (112) defined through said central tube (110), an engaging flange (111) extending radially outward from the top of said central tube (110);

a C-shaped member (20) having an upper annular recess (23) and a lower annular recess (231) defined in the outside thereof so that said upper flange (121) of said base member (10) is movably received in said lower annular recess (231);

a wire receiving member (30) having a hollow shaft (300) which has a lip (311) extending from the lower end thereof so as to be engaged with said engaging flange (111) of said central tube (110), an upper plate (31), a mediated plate (33) and a lower plate (312) respectively extending radially outward from said hollow shaft (300), said lower plate (312) having an annular teeth (310) defined in the bottom thereof and said mediated plate (33) having a notch (330) defined therein, said wire receiving member (30) rotatably received in said C-shaped member (20) and said base member (10);

a cap (40) having a second peripheral wall (44) extending from the periphery thereof and a rod (43) extending centrally from the bottom of said cap (40), said rod (43) securely inserted into said hollow shaft (300) so that when rotating said cap (40), said wire receiving member (30) is co-rotated, said second peripheral wall (44) having a flange (41) extending from the lower edge of said second peripheral wall (44) so as to be received in said upper annular recess (23) of said C-shaped member (20);

a bolt (60) threadedly engaged into said rod (43) and a spring (16) being biasedly mounted between said rod (43) and the head of said bolt (60), and a control member (51) movably received in said aperture (131) and having a pawl member (512) connected to the top thereof, said pawl member (512) engaged with said annular teeth (310) when said control member (51) is not pushed.

2. The device as claimed in claim 1 further comprising a concavity (123) defined in said lower flange defining said groove (122) of said first peripheral wall (12), said C-shaped member (20) having a protrusion (24) extending from the lower edge thereof such that when said protrusion (24) is received in said concavity (123), said C-shaped member (20) is limited to be rotated.

3. The device as claimed in claim 1, wherein said control member (51) has a pin (510) extending therefrom which has a spring (52) mounted thereto which is biased between said central tube (110) and said control member (51).

4. The device as claimed in claim 1 further comprising a decorative board (15) snapped on the bottom of said base member (10) and covering said bolt (60).

5. The device as claimed in claim 1 further comprising two ribs (430) extending radially outward from said rod (43), said hollow shaft (300) having two slots (320) defined in the inside thereof so as to receive said two ribs (430).

6. The device as claimed in claim 1 further comprising two guide members (13) extending from said central tube (110) so as to receive said pin (51) and said spring (62) therein.

7. The device as claimed in claim 1 further comprising a separating tube (42) extending from the bottom of said cap (40) so as to contact said upper plate (31) of said wire receiving member (30).

8. A wire receiving device comprising:

a cap (40) having a peripheral wall (400) extending from the periphery thereof;

a wire receiving member (30) connected to the bottom of said cap (40) so as to define an annular recess (45) between said wire receiving member (30) and said peripheral wall (400), said wire receiving member (30) having a notch (330) defined therein and a plurality of dents (312) defined in the bottom thereof, a lip (311) extending from the bottom of said wire receiving member (30);

a C-shaped member (20) having an upper track (21) and a lower track (21'), said upper track (21) rotatably received in said annular recess (45) and said lower track (21') having a protrusion (24) extending therefrom, and a base member (10) having a peripheral wall (100) extending from the bottom thereof and a hole (111) defined through the bottom thereof so that the lip (311) is rotatably engaged with the periphery defining said hole (111), said peripheral wall (100) having a wire entrance (120) defined therein and an annular groove (122) defined in the upper surface thereof so as to receive said lower track (21') of said ring member (20), a boss (113) extending upwardly from the bottom of said base member (10) so as to be received in one of said dents (312) when said wire receiving member (30) is rotated, the bottom defining said annular groove (122) of the base member (10) having a concavity (123) defined therein so as to receive said protrusion (24) to limit the rotation of said C-shaped member (20).

* * * * *